United States Patent
Wang et al.

(10) Patent No.: US 6,856,644 B1
(45) Date of Patent: Feb. 15, 2005

(54) METHOD AND APPARATUS FOR FORWARD LINK POWER CONTROL BIT GENERATION IN A SPREAD-SPECTRUM COMMUNICATION SYSTEM

(75) Inventors: Michael M. Wang, Carpentersville, IL (US); Louay A. Jalloul, Palatine, IL (US); Tyler Brown, Mundelein, IL (US)

(73) Assignee: Motorola, Inc., Schaumburg, IL (US)

( * ) Notice: Subject to any disclaimer, the term of this patent is extended or adjusted under 35 U.S.C. 154(b) by 730 days.

(21) Appl. No.: 09/702,382

(22) Filed: Oct. 31, 2000

(51) Int. Cl.[7] .................. H04B 1/69; H04B 7/216
(52) U.S. Cl. .............. 375/130; 375/144; 375/346; 370/320; 370/332
(58) Field of Search .............................. 375/140, 141, 375/144, 148, 346, 347, 130; 370/320, 332, 333; 455/522, 574

(56) References Cited

U.S. PATENT DOCUMENTS

| | | | | |
|---|---|---|---|---|
| 6,603,980 B1 | * | 8/2003 | Kitagawa et al. | 455/522 |
| 6,608,858 B1 | * | 8/2003 | Sih et al. | 375/147 |
| 6,633,552 B1 | * | 10/2003 | Ling et al. | 370/318 |
| 6,654,358 B1 | * | 11/2003 | Park et al. | 370/318 |

* cited by examiner

Primary Examiner—Temesghen Ghebretinsae
Assistant Examiner—Qutbuddin Ghulamali
(74) Attorney, Agent, or Firm—Steven A. May

(57) ABSTRACT

Power control bit generation for forward link power control in a spread spectrum communication system is accomplished through modification of a set point threshold. Modification of the set point reduces the number of squaring and division mathematical operations, thus more efficiently utilizing limited system resources in a mobile receiver used in forward link power control.

18 Claims, 5 Drawing Sheets

METHOD AND APPARATUS FOR FORWARD LINK POWER CONTROL BIT GENERATION IN A SPREAD-SPECTRUM COMMUNICATION SYSTEM

BACKGROUND OF THE INVENTION

The present invention relates to generation of power control bits in a communication system and, more particularly, to a method and apparatus for forward link power control bit generation in a spread-spectrum communication system such as a code division multiple access (CDMA) communication system.

Communication systems are known to employ power control methods that control the transmission energy of remote or mobile units. One such communication system employing power control is a spread-spectrum communication system. Power control in a spread-spectrum system serves two primary functions. First, because each remote unit's signal in a spread-spectrum system is typically transmitted at the same frequency, a majority of the noise associated with a received signal can be attributed to other remote units' transmissions. The magnitude of noise is directly related to the sum of the received signal power of each of the other remote units' transmissions. Thus, it is beneficial to control power such that a remote unit transmits at the lowest power level possible. Secondly, it is desirable to dynamically adjust the power of all remote units in such a way that their transmissions are received by a base station with approximately the same power level. To accomplish this, it is necessary for the closest transmitters to reduce their power as compared to the power of the furthest transmitters.

In some spread spectrum systems such as CDMA systems, a traffic channel forward link signal includes reverse link power control bits in the data stream that allow a base station to individually control the reverse link transmission power of a remote unit (i.e., mobile receiver unit) in its coverage area. After extracting a reverse link power control bit, the mobile unit responds to the power control command by adjusting its transmission power in the reverse link. This power control method accommodates changing channel conditions, such as fading or blocking, while retaining spectral efficiency and minimizing interference within the system. Moreover, the mobile unit can also be utilized to aid the base station in the control of the power on the forward link fundamental channel by transmitting forward link power control bits to the base station by puncturing the bits onto a pilot channel of the reverse link. This technique is particularly utilized in fast forward power control.

Within the context of the CDMA2000 standard, fast forward power control is utilized as a technique to mitigate the effects of fast fading. In this technique, an estimate of the signal to interference plus noise ratio (SINR) determined at the remote unit is compared to a threshold ($\Gamma$) in order to generate the power control bits (PCB's) for forward power control. Dependent on whether the SINR is greater or smaller than the threshold $\Gamma$, the PCB is typically set to either a binary "1" or "0" (e.g., "0" indicating increase power and "1" indicating decrease power) and transmitted to the base station by puncturing on the reverse link pilot channel. The threshold $\Gamma$ is determined by outer loop control and typically set every 20 msec. Additionally, the reverse link power control bits punctured on the fundamental forward link channel are sent at a known power level and rate relative to the full rate of the forward fundamental channel.

A problem with the type of fast forward power control described above is that for the forward link control a reliable estimate of the SINR must be found by the mobile receiver without excessively utilizing the limited processing resources of the mobile receiver. Effective and efficient power control is vital to system performance. Thus, there is a need for rapid and accurate detection of information used for spread spectrum power control, such as characteristics of the traffic channel forward link signals (e.g., the SINR) without significantly increasing processing requirements.

BRIEF DESCRIPTION OF THE DRAWINGS

Reference is made to the attached drawings, wherein elements having the same reference numeral designations represent like elements throughout and wherein.

DETAILED DESCRIPTION OF THE PREFERRED EMBODIMENTS

The present invention is directed to a method and apparatus for forward link power control bit generation in a spread spectrum communication system. In particular, the present method and apparatus are applicable to a code division multiple access (CDMA) communication system that employs fast forward power control in order to mitigate fast fading and, more particularly, a method and apparatus to generate the power control bit (PCB) at the mobile receiver. The present invention will be described by first discussing a method and apparatus used to find a reliable estimate of the signal to interference plus noise ratio (SINR) at the mobile receiver. Preferred embodiments of the present invention will then be described that more efficiently set the forward link power control bit through adapting the threshold $\Gamma$ (also termed as a set point), which eliminates the need for square root or division operations that reduce efficiency because these operations require greater system resources. The preferred embodiments of the present invention described below, however, may be embodied otherwise without departing from the scope of their teachings.

Figure 1:
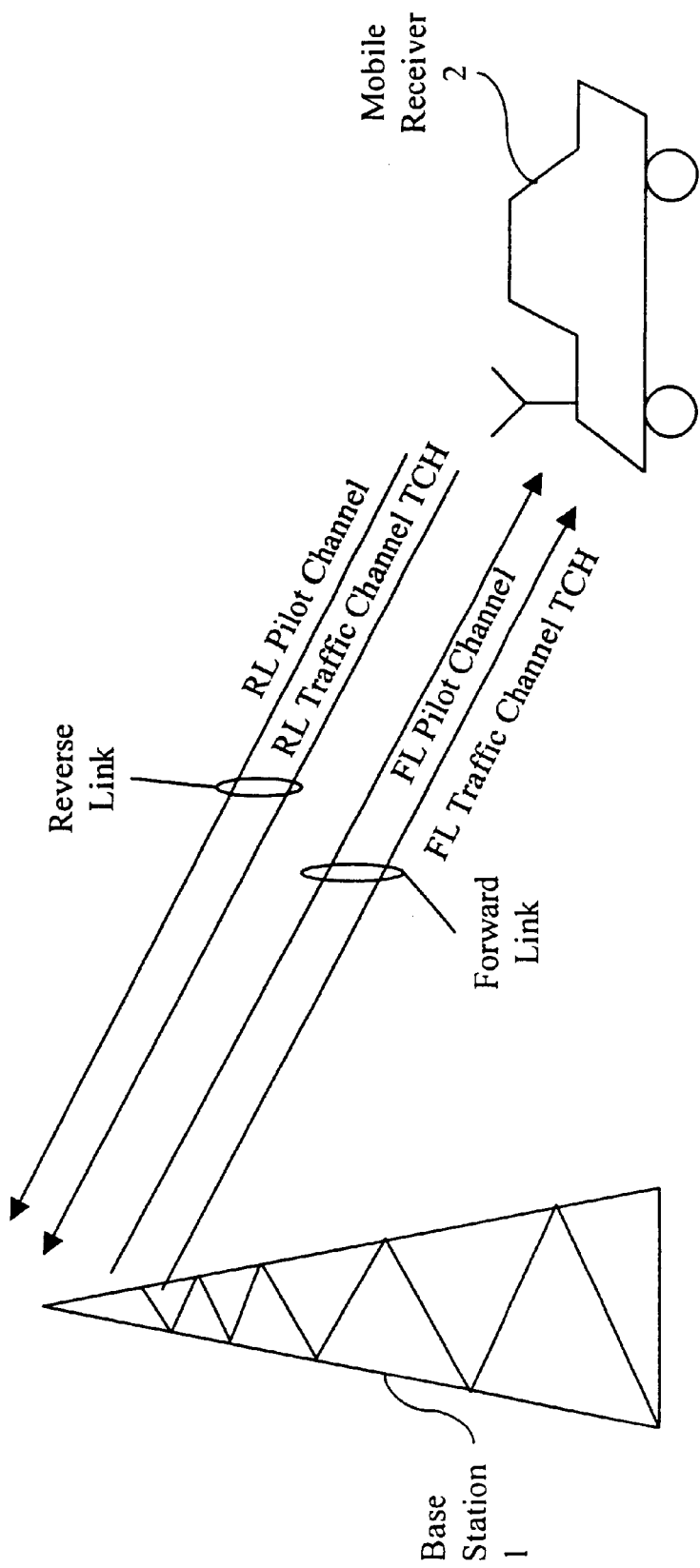
FIG. 1 illustrates a communication system in which the present invention may be utilized.

FIG. 1 illustrates a typical environment in a wireless communication system. A base station 1 within a cell transmits a forward link channel including a transmit channel TCH and a pilot channel to a mobile receiver 2. The mobile receiver 2, in turn, transmits traffic and pilot channels via a reverse link as shown in FIG. 1. In a system using this infrastructure and the CDMA2000 standard, the forward link traffic channel contains reverse link power control bits that are used by the mobile receiver 2 to estimate the signal to interference plus noise ratio (SINR) of the forward link and generate the forward link power control bit by comparing the estimate of the SINR to a power control set point $\Gamma$. The forward link power control bits to be punctured by the mobile unit 2 on the reverse link pilot channel are set to a binary value "1" if the estimated SINR of the forward link is larger than the set point $\Gamma$; otherwise the power control bits are set to a binary value of "0". The reverse link power control bits sent on the forward channel have a known power level relative to the forward traffic channel symbols and they occur at a constant rate. However, dependent on the number of reverse link power control bits punctured on each transmit diversity channel, the estimation of the SINR at the mobile receiver from the reverse link power control bits requires different methodologies.

If the number of reverse link power control bits punctured on each diversity channel (i.e., NPCB's) is an even number and the puncture position starts at a boundary of a quadrature phase shift key (QPSK) symbol, estimation of the SINR of the forward link can be performed by directly calculating the energy of the particular QPSK symbols within which the reverse link power control bits are punctured. Conversely, if the number of reverse link power control bits punctured on each diversity channel is an odd number or the starting position of the puncturing is inside one QPSK symbol, estimation of the SINR requires extracting the power control bits from the QPSK symbols and then subsequently calculating the total energy from these extracted power control bits. It is in this latter case that the present invention is especially utilized to achieve efficient generation of the forward link power control bit within the mobile receiver (i.e., the extraction of reverse link power control bits).

Figure 2:
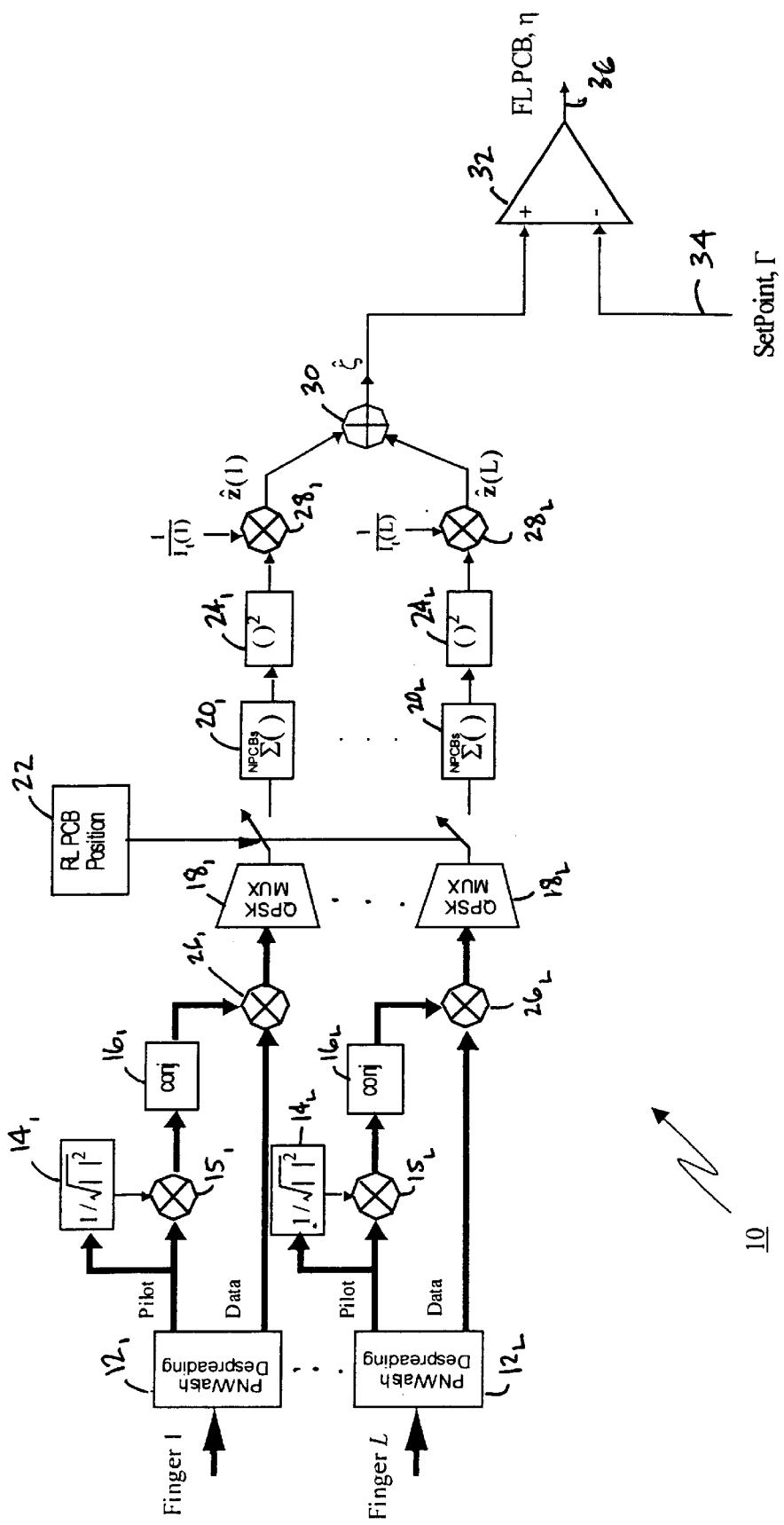
FIG. 2 illustrates an apparatus for forward link power control.

FIG. 2 illustrates a system for power control bit generation shown generally at 10 that can be utilized at a mobile receiver. The system includes a receiver (e.g., a RAKE receiver) having pseudo-random noise and Walsh code despreading blocks $12_1$ through $12_L$ that respectively receive multipath fingers l of the transmitted signals modulated with a QPSK modulation scheme with l=1, 2, . . . , L, where L is the total number of multipath fingers. The multipath components of the pilot and data channels are output from each of the respective blocks 12. From these outputs of the despread QPSK output symbols, an estimate of the symbol energy is made. Since these signals are complex, however, the signals cannot be used directly to estimate the symbol energy due to complex channel fading as represented by a complex fading channel coefficient $\alpha e^{j\theta}$. That is, the real and imaginary parts of the symbol energy contain crosstalk between one another. Hence, the energy must be estimated using the entire QPSK symbol. Consequently, since the number of reverse link punctured bits is sometimes an odd integer, use of the entire QPSK symbol is not possible. In this case, therefore, symbol energy must be estimated after a channel phase rotation has been performed. Channel phase rotation is accomplished by multiplying the symbol energy by a channel estimate obtained from the pilot channel. The system of FIG. 2 utilizes only the phase of the channel estimate obtained from the despread pilot channel to correct the channel phase rotation. In order to abstract the phase only information, the channel gain must be normalized. In order to perform this normalization, the despread pilot samples are divided by the square root of the squares of the real and imaginary components as indicated by normalizers $14_1$ through $14_L$, whose resultants are multiplied by the pilot channel as shown by multipliers $15_1$ through $15_L$.

Next, conjugates of each of the resultants from the multipliers 15 are respectively determined by blocks $16_1$ through $16_L$ and output to multipliers $26_1$ though $26_L$, which multiply the conjugates by the data channel symbols. The results of the multiplications performed by the multipliers 26 are then input to respective QPSK multiplexers $18_1$ thought $18_L$, which demodulate an N number of reverse link power control bits at the direction of a reverse link power control bit position device 22. The N number of power control bits are summed for each diversity channel by summing blocks $20_1$ though $20_L$. The demodulated soft bits represented by z(l) are next normalized by first squaring as indicated by blocks $24_1$ through $24_L$ and then dividing by the $l^{th}$ value of the noise variance $I_l(l)$ at the input of the $l^{th}$ finger despreader at multipliers $28_1$ through $28_L$.

An estimate of the signal to interference plus noise ratio (denoted by $\zeta$) is obtained by summing the L number of products of z(l) multiplied by $I_l$ via summation block 30, which performs Maximal-Ratio Combining (MRC), and is input to comparator 32. The comparator 32 compares the estimated signal to interference plus noise ratio with a set point $\Gamma$ in order to generate the forward link power control bit (FL PCB 0) shown at output 36 of comparator 32. Ideally, the power control bit is set to a binary value "1" if the signal to interference plus noise ratio is greater than the set point $\Gamma$. Otherwise, if the signal to interference plus noise ratio is less than or equal to the set point the power control bit is set to a binary value "0".

The circuit arrangement of FIG. 2 is an acceptable way of setting a power control bit for the forward link fundamental channel, even in instances were the number of reverse link power control bits punctured on each diversity channel is an odd number or the starting position of the puncturing is within one QPSK symbol. However, this scheme requires normalization of the pilot channel through the use of square root and division operations, which require greater usage of processing resources in the mobile receiver. Hence, it is desirable to utilize a method that does not require square root or division operations (i.e., normalization of the pilot channel). Responsive to this need, preferred embodiments of the present invention are discussed as follows.

Figure 3:
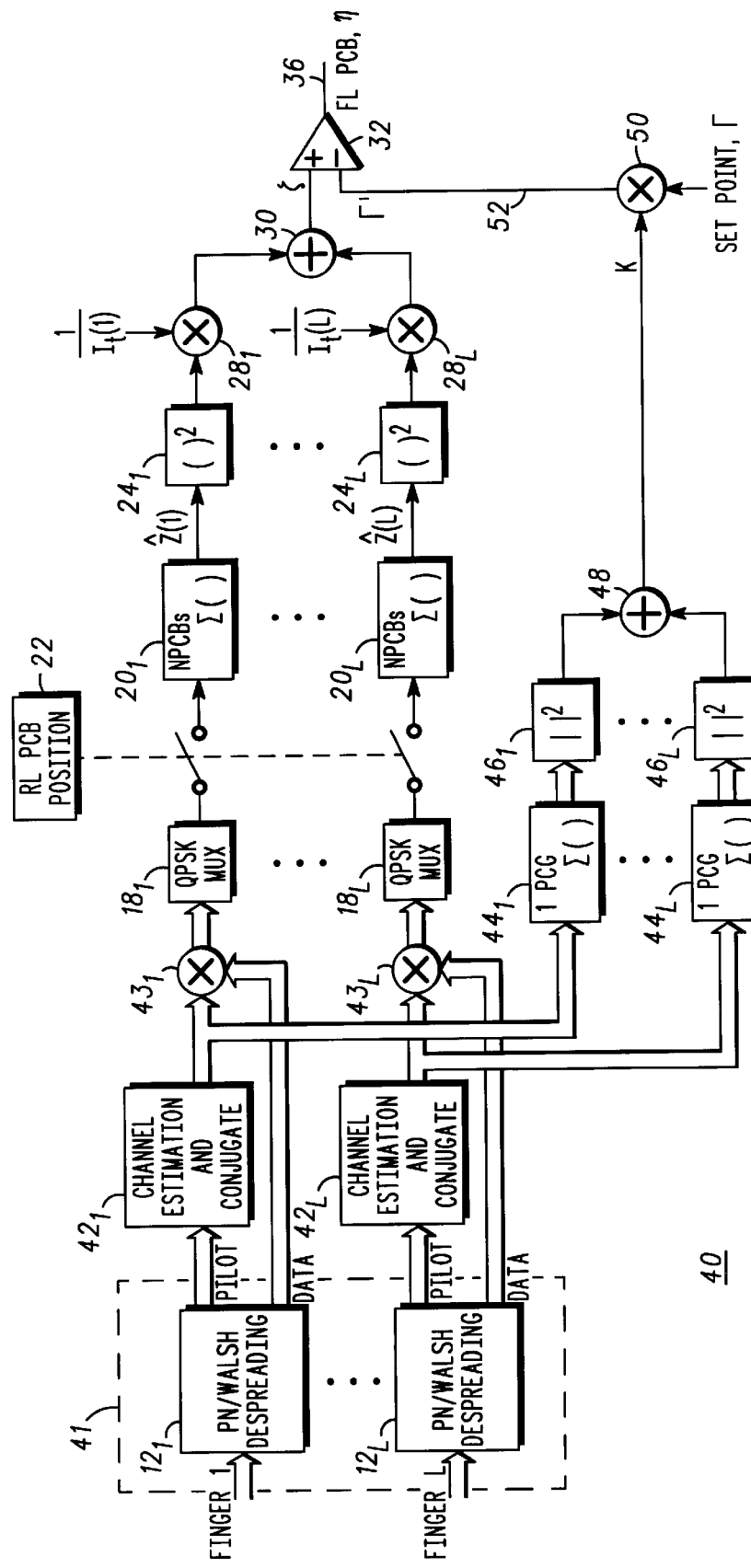
FIG. 3 illustrates an apparatus for forward link power control according to an embodiment of the present invention.

FIG. 3 illustrates a system shown generally at 40 for generating a forward link power control bit. Similar to the system shown in FIG. 2, system 40 includes a receiver 41 receiving fingers 1 through L at respective pseudo-random noise/Walsh code despreading blocks $12_1$ through $12_L$. The pilot channels of each of the multipath finger components are respectively delivered to channel estimation and conjugate estimating portions $42_1$ through $42_L$, which estimate the pilot channel power and determine the conjugate of the complex power that has been estimated. This resultant is then multiplied with the data channel with multipliers $43_1$ through $43_L$ and the results delivered to QPSK multiplexers $18_1$ through $18_L$. The multiplexers serve to demodulate the QPSK modulated symbols under the direction of the reverse link power control bit positioning control 22. Items 20, 24, 28, and 30, constituting a SINR estimating circuit, operate the same as those described previously with respect to system 10 disclosed in FIG. 2 to estimate the signal to interference plus noise ratio that is used by comparator 32 to determine the forward link power control bit.

Different from the system shown in FIG. 2, the system 40 of FIG. 3 includes a circuit for adapting or modifying the set point $\Gamma$ based on the energy of the pilot channel (i.e., elements 44, 46, 48 and 50). Modifying the set point F based on the energy of the pilot channel minimizes the effect of pilot channel power on the estimated data after channel demodulation by the multiplexers 18. It will be appreciated by those of ordinary skill in the art that the modification of the set point can be based on other characteristics of the pilot channel, as will be discussed later.

A set point correction factor K is determined by first inputting the outputs of the channel estimation and conjugation from blocks $42_1$ through $42_L$ to summation blocks $44_1$ through $44_L$. The summation blocks $44_1$ through $44_L$ sum the power control groups for each multipath component finger of the pilot channel. Blocks $44_1$ through $44_L$ then respectively output the sums of the power control groups to squaring operators $46_1$ through $46_L$ that determine the square of the absolute values of the summations derived by blocks $44_1$ through $44_L$. These values computed in blocks 44 for each of fingers 1 through L are then summed by summing node 48 in order to determine the set point correction factor κ. This factor κ is then multiplied by the set point Γ at multiplier node 50 in order to output an adapted or modified set point Γ shown at line 52 (i.e., Γ'=κΓ). This modified set point Γ' is then input to comparator 32 and compared with the estimated signal to interference plus noise ratio in order to determine the forward link power control bit by utilizing the same criteria as used in the system of FIG. 2. The use of a pilot power modified set point Γ' affords power control bit generation without the need for extracting phase information by normalization by the channel gain, which is determined by dividing despread pilot samples by the square root of the sum of the squares of the real and imaginary components of the pilot as performed in blocks 14 of FIG. 2. Hence, the system of FIG. 3 avoids using square root and division operations used in the system of FIG. 2 thereby using fewer system processing resources of the mobile receiver.

Figure 4:
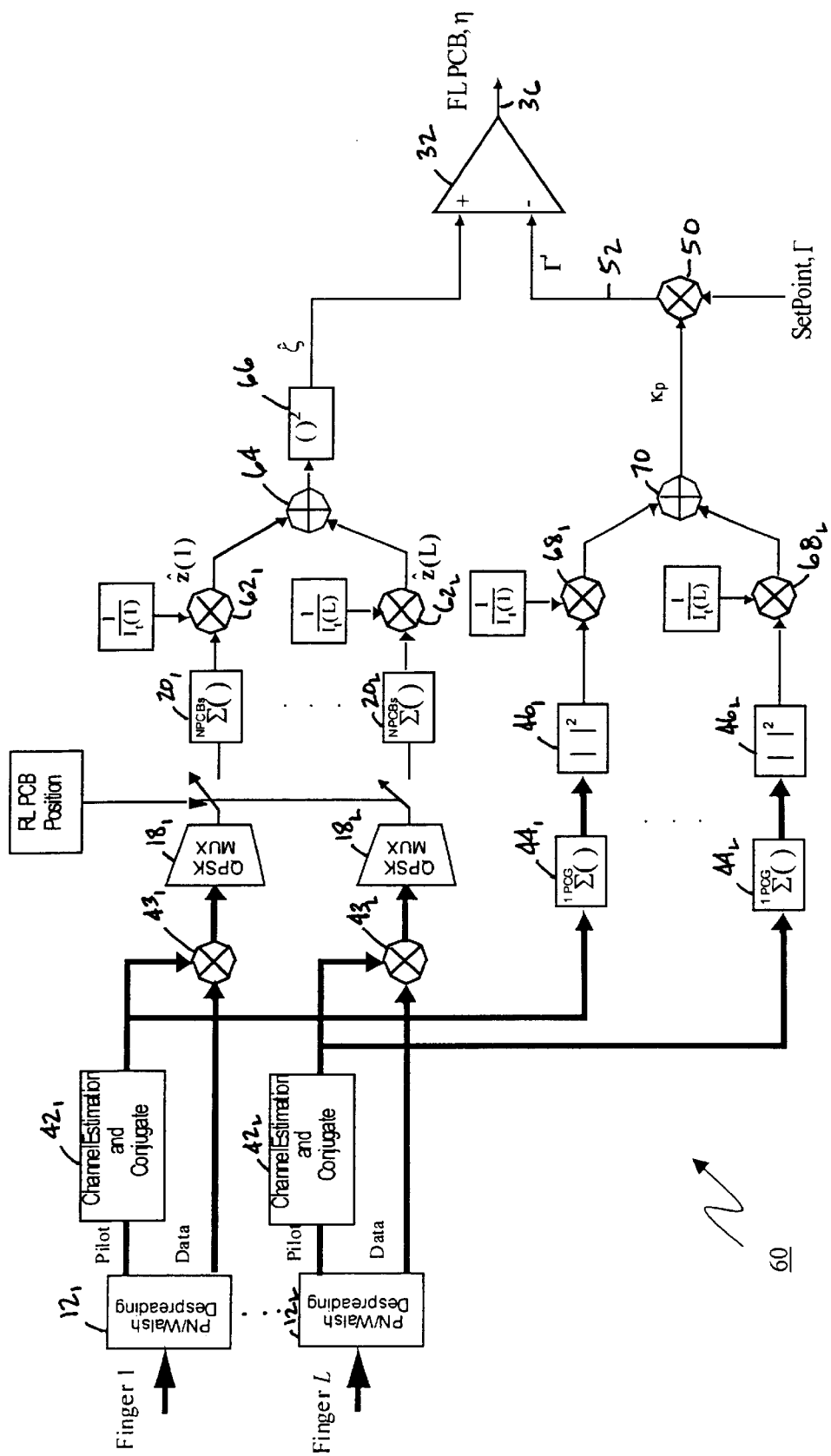
FIG. 4 illustrates an apparatus for forward link power control according to another embodiment of the present invention.

FIG. 4 illustrates another embodiment that adapts or modifies the set point Γ based on an estimated signal to interference plus noise ratio of the pilot channel. Specifically, the system 60 of FIG. 4 adds multipliers $68_1$ through $68_L$ in the circuit for modifying the set point Γ that multiply the estimated signal energy of the pilot channel by the inverse of the noise variance $I_f(l)$ of the respective 1 through L number of fingers. The estimates of the signal to interference plus noise ratio are then summed by summing node 70 to arrive at a set point correction factor κ, which is then subsequently multiplied by multiplier 50 with the set point Γ to achieve Γ' (i.e., Γ'=κΓ).

FIG. 4 further includes a different arrangement in the circuit portion that estimates the signal to interference plus noise ratio of the entire channel. Specifically, the sum of the received reverse link power control bit samples punctured on each diversity channel (NPCB) is determined by summing operators $20_1$ through $20_L$ and the respective resultant of each of these operators 20 is multiplied via multipliers $62_1$ through $62_L$ by a respective inverse of the noise variance $I_f(l)$ to derive the soft coded bits z(l). The resultants of the multipliers 62 are then summed by summing node 64, the output of the summing node 64 being squared by squaring operator 66 to compute the estimated SINR. Similar to the arrangement of FIG. 3, the system of FIG. 4 does not require square root and division operations for normalization of the pilot channel as required by the configuration of FIG. 2, thus more efficiently utilizing and conserving processing resources at the mobile unit 2.

Figure 5:
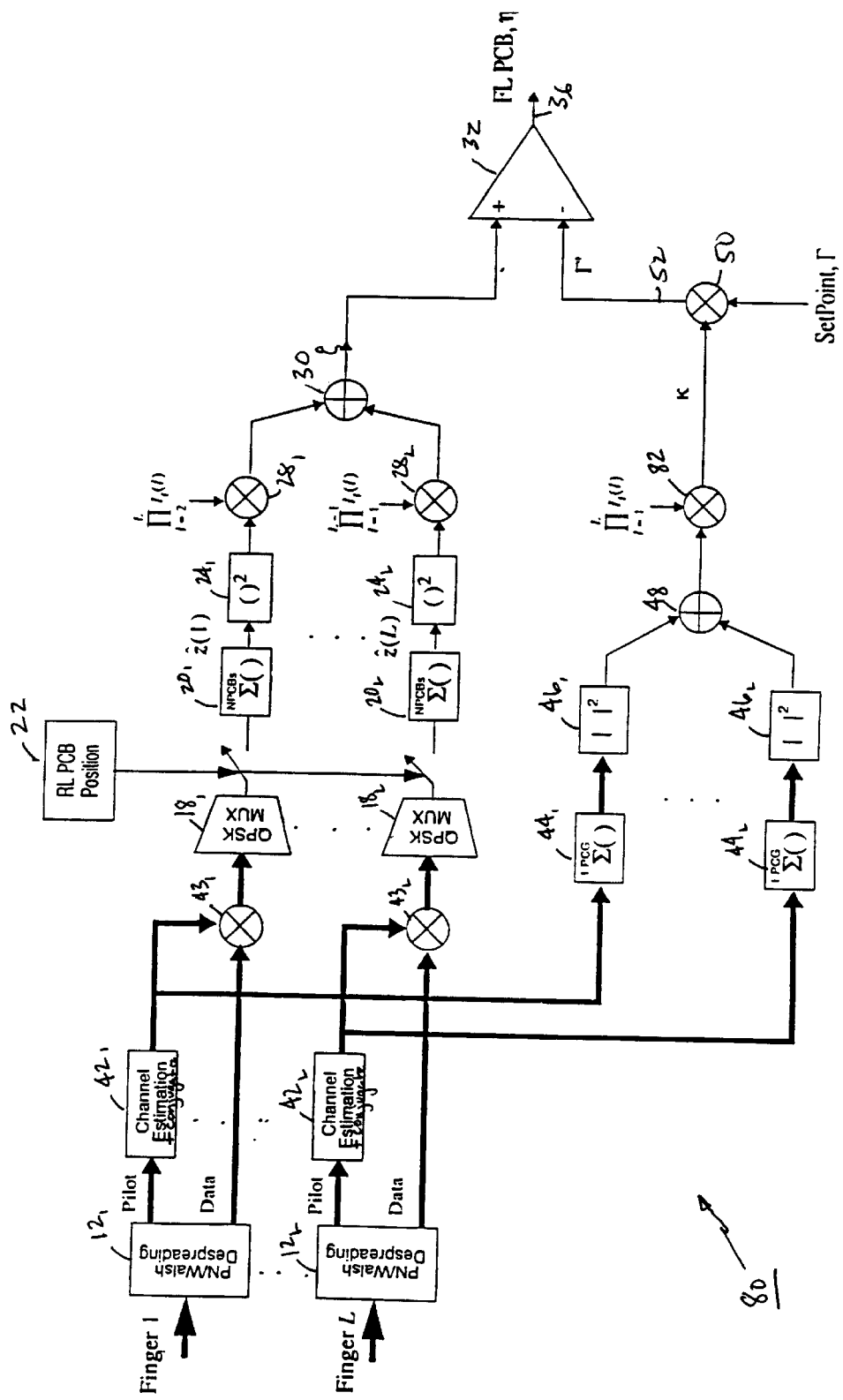
FIG. 5 illustrates an apparatus for forward link power control according to yet another embodiment of the present invention.

According to yet another embodiment, FIG. 5 illustrates a system for determining a forward link power control bit, shown generally at 80, that requires no division operations whatsoever. Specifically, in contrast to the systems of FIGS. 3 and 4, which compute the inverse of the noise variance $I_f(l)$ (i.e., $1/I_f(l)$), the system 80 of FIG. 5 multiplies each finger's signal by the product of the other fingers' noise variances (i.e., the product of all values of $I_f(m)$ where m does not equal l). These products are shown illustrated in the SINR estimating portion of the system 80 by multiplying the products by the squares of the soft-coded bits z(l) with multipliers $28_1$ through $28_L$. Hence, at the node 30 in FIG. 5 the following relationship applies to derive the signal to interference plus noise ratio:

$$\zeta = \sum_{l=1} z^2(l) \prod_{m \neq l} I_f(m)$$

However, the signal to interference plus noise ratio not only measures data power, but also pilot power, which is a factor that is not controllable by forward link power control. Therefore, the power control will not function properly if the signal to interference plus noise ratio estimate is based solely on the above equation. To eliminate this problem, a set point correction factor K according to the following relationship is utilized to modulate the power control set point Γ:

$$\kappa = \sum_{l} A_p^2(l) \prod_{l=1}^{L} I_f(l)$$

In the above equation, it can be seen that the product of all of the fingers' noise variances $I_f$ multiplied by the sum of the pilot channel QPSK chip amplitudes $(A_p)$ squared yields a set point correction factor that adapts to the combination of pilot channel power and noise variance such that a power control bit generating function g where g=ζ/Γ' does not depend on the QPSK chip amplitude of the pilot channel (i.e., $A_p$). The relationship in the above equation is shown implemented in the system 80 by adding multiplier 82 in the set correction factor modifying circuit portion where the multiplier 82 receives the output of the summing node 48. By utilizing the above-described equations and apparatus, the system shown in FIG. 5 further does not require the utilization of processing system resources in the mobile receiver to accomplish forward link power control bit generation since no division operations are required.

The above-described embodiments achieve reliable estimation of a signal to interference plus noise ratio (SINR), while efficiently utilizing system resources of a mobile receiver. The present methods and apparatuses achieve efficiency by eliminating the need for square root or division operations that reduce efficiency because these operations require greater system resources. Elimination of the need for square root and division operations is accomplished through modification of the set point Γ. It will be further apparent, however, that other embodiments other than the specific preferred embodiments described above may be devised without departing from the fair scope of the appended claims and their equivalents.

What is claimed is:

1. An apparatus for generating power control bits in a communication system comprising:

a receiver configured to receive at least one transmitted signal, the receiver comprised of one or more finger receivers each configured to receive a corresponding multipath component of the at least one transmitted signal and resolve the multipath components into corresponding pilot and data channels;

one or more pilot channel processors corresponding to each of the one or more finger receivers, each of the one or more pilot channel processors receiving a respective pilot channel from a corresponding finger receiver of the one or more finger receivers and outputting a first value based on at least one characteristic of the received pilot channel a set point value modifying circuit configured to modify a set point value based on the first value and output a modified set point value, wherein the set point modifying circuit comprises a processing portion configured to generate a set point correction factor based on the first value and a multiplier configured to multiply the set point value with the set point correction factor;

an estimating circuit for calculating an estimated signal to interference plus noise ratio of the at least one transmitted signal; and a power control bit generator configured to output a power control bit having a state that is determined by the power control bit generator using a predetermined analysis based on the modified set point value and the estimated signal to interference plus noise ratio.

2. The apparatus of claim 1, wherein the at least one characteristic is an estimate of an energy level of the received pilot channel.

3. The apparatus of claim 1, wherein the at least one characteristic is an estimate of an energy level of the received pilot channel and the processing portion of the set point modifying circuit computes an estimated signal to interference plus noise ratio of the pilot channel based on the at least one characteristic.

4. An apparatus for generating power control bits in a communication system comprising:

a receiver configured to receive at least one transmitted signal, the receiver comprised of one or more finger receivers each configured to receive a corresponding multipath component of the at least one transmitted signal and resolve the multipath components into corresponding pilot and data channels;

one or more pilot channel processors corresponding to each of the one or more finger receivers, each of the one or more pilot channel processors receiving a respective pilot channel from a corresponding finger receiver of the one or more finger receivers and outputting a first value based on at least one characteristic of the received pilot channel;

a set point value modifying circuit configured to modify a set point value based on the first value and output a modified set point value;

an estimating circuit for calculating an estimated signal to interference plus noise ratio of the at least one transmitted signal; and a power control bit generator configured to output a power control bit having a state that is determined by the power control bit generator using a predetermined analysis based on the modified set point value and the estimated signal to interference plus noise ratio, wherein the power control bit generator includes a comparator and the predetermined analysis comprises:

comparing the modified set point to the signal to interference plus noise ratio with the comparator; and outputting from the comparator the at least one state having a binary value of one when the signal to interference plus noise ratio is greater than the modified set point; and outputting from the comparator the at least one state having a binary value of zero when the signal to interference plus noise ratio is one of less than and equal to the modified set point.

5. An apparatus for generating power control bits in a communication system comprising:

a receiver configured to receive at least one transmitted signal, the receiver comprised of one or more finger receivers each configured to receive a corresponding multipath component of the at least one transmitted signal and resolve the multipath components into corresponding pilot and data channels;

one or more pilot channel processors corresponding to each of the one or more finger receivers, each of the one or more pilot channel processors receiving a respective pilot channel from a corresponding finger receiver of the one or more finger receivers and outputting a first value based on at least one characteristic of the received pilot channel, the one or more pilot channel processors each including a channel estimator for estimating a power of the pilot channel and a conjugate calculator for calculating the conjugate of the estimated power of the pilot channel;

a set point value modifying circuit configured to modify a set point value based on the first value and output a modified set point value;

an estimating circuit for calculating an estimated signal to interference plus noise ratio of the at least one transmitted signal; and a power control bit generator configured to output a power control bit having a state that is determined by the power control bit generator using a predetermined analysis based on the modified set point value and the estimated signal to interference plus noise ratio.

6. The apparatus of claim 5, further comprising:

at least one first multiplier corresponding to a respective one of the at least one finger receivers, the at least one first multiplier multiplying the conjugate of the estimated power of the pilot channel output from the at least one pilot channel processor by the data channel and outputting a respective resultant; and one or more multiplexers each receiving the respective resultant, the one or more multiplexers configured to demodulate the respective resultant and output a demodulated signal to the estimating circuit.

7. An apparatus for generating power control bits in a communication system comprising:

a receiver configured to receive at least one transmitted signal, the receiver comprised of one or more finger receivers each configured to receive a corresponding multipath component of the at least one transmitted signal and resolve the multipath components into corresponding pilot and data channels;

one or more pilot channel processors corresponding to each of the one or more finger receivers, each of the one or more pilot channel processors receiving a respective pilot channel from a corresponding finger receiver of the one or more finger receivers and outputting a first value based on at least one characteristic of the received pilot channel;

a set point value modifying circuit configured to modify a set point value based on the first value and output a modified set point value;

an estimating circuit for calculating an estimated signal to interference plus noise ratio of the at least one transmitted signal, wherein the estimating circuit estimates the SINR based on one or more received second values related to noise variance of the one or more multipath channels and wherein the one or more received second values are the inverse of each respective value of a finger's noise variance; and a power control bit generator configured to output a power control bit having a state that is determined by the power control bit generator using a predetermined analysis based on the modified set point value and the estimated signal to interference plus noise ratio.

8. An apparatus for generating power control bits in a communication system comprising:

a receiver configured to receive at least one transmitted signal, the receiver comprised of one or more finger receivers each configured to receive a corresponding multipath component of the at least one transmitted signal and resolve the multipath components into corresponding pilot and data channels;

one or more pilot channel processors corresponding to each of the one or more finger receivers, each of the one or more pilot channel processors receiving a respective pilot channel from a corresponding finger receiver of the one or more finger receivers and outputting a first value based on at least one characteristic of the received pilot channel;

a set point value modifying circuit configured to modify a set point value based on the first value and output a modified set point value;

an estimating circuit for calculating an estimated signal to interference plus noise ratio of the at least one transmitted signal, wherein the estimating circuit estimates the SINR based on one or more received second values related to noise variance of the one or more multipath channels and wherein the one or more received second values is the product of all fingers' noise variance excluding a noise variance of the particular finger; and a power control bit generator configured to output a power control bit having a state that is determined by the power control bit generator using a predetermined analysis based on the modified set point value and the estimated signal to interference plus noise ratio.

9. The apparatus of claim 8, wherein the set point value modifying circuit is further configured to modify the set point value using a product of all the fingers' noise variances.

10. An apparatus for generating power control bits in a communication system comprising:

a receiver configured to receive at least one transmitted signal, the receiver comprised of one or more finger receivers each configured to receive a corresponding multipath component of the at least one transmitted signal and resolve the multipath components into corresponding pilot and data channels;

one or more pilot channel processors corresponding to each of the one or more finger receivers, each of the one or more pilot channel processors receiving a respective pilot channel from a corresponding finger receiver of the one or more finger receivers and outputting a first value based on at least one characteristic of the received pilot channel;

a set point value modifying circuit configured to modify a set point value based on the first value and output a modified set point value;

an estimating circuit for calculating an estimated signal to interference plus noise ratio of the at least one transmitted signal, wherein the estimating circuit includes multiple processing paths corresponding to each multipath channel that each calculate a respective soft-coded bit value for each multipath channel and a summing junction that sums all of the soft-coded bit values; and a power control bit generator configured to output a power control bit having a state that is determined by the power control bit generator using a predetermined analysis based on the modified set point value and the estimated signal to interference plus noise ratio.

11. A method for generating power control bits in a communication system comprising the steps of:

receiving at least one transmitted signal having one or more multipath components;

resolving each of one or more multipath components into corresponding pilot and data channels;

processing each of the pilot channels and outputting a first value based on at least one characteristic an estimated SINR of the respective received pilot channel determined by the processing;

modifying a set point value based on the first value and outputting a modified set point value;

calculating an estimated signal to interference plus noise ratio (SINR) of the at least one transmitted signal; and setting a power control bit having at least one state according to a predetermined analysis based on the modified set point value and the estimated signal to interference plus noise ratio.

12. A method for generating power control bits in a communication system comprising the steps of:

receiving at least one transmitted signal having one or more multipath components;

resolving each of one or more multipath components into corresponding pilot and data channels;

processing each of the pilot channels and outputting a first value based on at least one characteristic of the respective received pilot channel determined by the processing;

modifying a set point value based on the first value and outputting a modified set point value;

calculating an estimated signal to interference plus noise ratio (SINR) of the at least one transmitted signal; and setting a power control bit having at least one state according to a predetermined analysis based on the modified set point value and the estimated signal to interference plus noise ratio, wherein setting the power control bit comprises:

comparing the modified set point to the SINR of the transmitted signal;

setting the at least one state to a binary value of one when the modified set point is less than the signal to interference plus noise ratio; and setting the at least one state to a binary value of zero when the modified set point is greater or equal to the signal to interference plus noise ratio.

13. A method for generating power control bits in a communication system comprising the steps of:

receiving at least one transmitted signal having one or more multipath components;

resolving each of one or more multipath components into corresponding pilot and data channels;

processing each of the pilot channels and outputting a first value based on at least one characteristic of the respective received pilot channel determined by the processing, wherein the step of processing each of the pilot channels comprises estimating a power of the pilot channel and calculating a conjugate of the estimated power of the pilot channel;

modifying a set point value based on the first value and outputting a modified set point value;

calculating an estimated signal to interference plus noise ratio (SINR) of the at least one transmitted signal; and setting a power control bit having at least one state according to a predetermined analysis based on the modified set point value and the estimated signal to interference plus noise ratio.

14. The method of claim 13, further comprising:

multiplying the conjugate of the estimated power of the pilot channel with the data channel to achieve a resultant product;

multiplexing the resultant product in order to demodulate transmitted signal prior to calculating an estimated signal to interference plus noise ratio (SINR) of the at least one transmitted signal.

15. A method for generating power control bits in a communication system comprising the steps of:

receiving at least one transmitted signal having one or more multipath components;

resolving each of one or more multipath components into corresponding pilot and data channels;

processing each of the pilot channels and outputting a first value based on at least one characteristic of the respective received pilot channel determined by the processing;

modifying a set point value based on the first value and outputting a modified set point value;

calculating an estimated signal to interference plus noise ratio (SINR) of the at least one transmitted signal, wherein the SINR of the transmitted signal is estimated based on one or more received second values related to noise variance of the one or more multipath channels and wherein the one or more received second values are the inverse of each respective value of noise variance of the one or more multipath channels; and setting a power control bit having at least one state according to a predetermined analysis based on the modified set point value and the estimated signal to interference plus noise ratio.

16. A method for generating power control bits in a communication system comprising the steps of:

receiving at least one transmitted signal having one or more multipath components;

resolving each of one or more multipath components into corresponding pilot and data channels;

processing each of the pilot channels and outputting a first value based on at least one characteristic of the respective received pilot channel determined by the processing;

modifying a set point value based on the first value and outputting a modified set point value;

calculating an estimated signal to interference plus noise ratio (SINR) of the at least one transmitted signal, wherein the SINR of the transmitted signal is estimated based on one or more received second values related to noise variance of the one or more multipath channels and wherein the one or more received second values is the product of noise variances of the one or more multipath channels excluding a noise variance of a particular multipath channel; and setting a power control bit having at least one state according to a predetermined analysis based on the modified set point value and the estimated signal to interference plus noise ratio.

17. The method of claim 16, wherein the set point value modifying circuit is further configured to modify the set point value using a product of all noise variances of the one or more multipath channels.

18. A method for generating power control bits in a communication system comprising the steps of:

receiving at least one transmitted signal having one or more multipath components;

resolving each of one or more multipath components into corresponding pilot and data channels;

processing each of the pilot channels and outputting a first value based on at least one characteristic of the respective received pilot channel determined by the processing;

modifying a set point value based on the first value and outputting a modified set point value;

calculating an estimated signal to interference plus noise ratio (SINR) of the at least one transmitted signal, wherein calculating the estimated SINR of the transmitted signal comprises calculating a soft-coded bit value for each multipath channel and summing all of the calculated soft-coded bit values; and setting a power control bit having at least one state according to a predetermined analysis based on the modified set point value and the estimated signal to interference plus noise ratio.

* * * * *